US012780333B2

(12) United States Patent
King

(10) Patent No.: US 12,780,333 B2
(45) Date of Patent: Nov. 3, 2026

(54) DEVICES, SYSTEM AND METHODS FOR MODIFYING AERODYNAMICS

(71) Applicant: STREAM IT, INC., Austin, TX (US)

(72) Inventor: Lance M. King, Austin, TX (US)

(73) Assignee: STREAM IT, INC., Austin, TX (US)

( * ) Notice: Subject to any disclaimer, the term of this patent is extended or adjusted under 35 U.S.C. 154(b) by 362 days.

(21) Appl. No.: 18/240,303

(22) Filed: Aug. 30, 2023

(65) Prior Publication Data

US 2024/0075993 A1 Mar. 7, 2024

Related U.S. Application Data

(60) Provisional application No. 63/534,773, filed on Aug. 25, 2023, provisional application No. 63/403,496, filed on Sep. 2, 2022.

(51) Int. Cl.
*B62D 35/00* (2006.01)

(52) U.S. Cl.
CPC .................................. *B62D 35/001* (2013.01)

(58) Field of Classification Search
CPC .................................................... B62D 35/001
See application file for complete search history.

(56) References Cited

U.S. PATENT DOCUMENTS

| | | | | |
|---|---|---|---|---|
| 8,308,445 | B2 | 11/2012 | Gammack et al. | |
| 8,870,275 | B1 * | 10/2014 | Schmidt | F15D 1/008 244/209 |
| 9,333,995 | B1 * | 5/2016 | Piotrowski | B62D 35/001 |
| 2004/0239146 | A1 * | 12/2004 | Ortega | B62D 35/001 296/180.2 |
| 2011/0037290 | A1 * | 2/2011 | Pickering | B62D 37/02 296/180.2 |
| 2014/0217740 | A1 * | 8/2014 | McMahon | F03D 9/25 290/55 |
| 2020/0353997 | A1 * | 11/2020 | Ruschman | B62D 37/02 |

OTHER PUBLICATIONS

FR 2613682 A1 (Year: 1988).*

* cited by examiner

*Primary Examiner* — Lori Lyjak
(74) *Attorney, Agent, or Firm* — Buchalter LLP

(57) ABSTRACT

Devices, systems and methods are provided for modifying aerodynamics, especially on vehicles. A system can be provided on a vehicle and comprise at least one venturi generator. A system can be provided on a vehicle comprising components to redirect air from a slot near or on a surface of a vehicle, for example, a top or side of a vehicle, to an air exhaust on another portion of a vehicle, for example, a rear of the vehicle.

8 Claims, 2 Drawing Sheets

DEVICES, SYSTEM AND METHODS FOR MODIFYING AERODYNAMICS

CROSS-REFERENCE TO RELATED APPLICATIONS

This application claims priority to U.S. Provisional application No. 63/403,496, filed on Sep. 2, 2022, and U.S. Provisional application No. 63/534,773, filed on Aug. 25, 2023. These and all other extrinsic materials discussed herein, including publications, patent applications, and patents, are incorporated by reference in their entirety. Where a definition or use of a term in an incorporated reference is inconsistent or contrary to the definition of that term provided herein, the definition of that term provided herein applies and the definition of the term in the reference does not apply.

TECHNICAL FIELD

Devices, systems and methods provided herein relate to modifying aerodynamics, especially on vehicles.

SUMMARY

Vehicles, such as trailers and trucks, often have a generally loaf or box like shape that allow for efficient use of an internal space (e.g., for beds, tables, boxes, containers, seats). Loaf or box like shape vehicles can more efficiently fit a bed, table, and other items, can feel homier, and can be easier for people to dwell in and navigate through. Unfortunately, such vehicles can be bulky, heavy, fuel inefficient, and difficult or even dangerous to drive or maneuver. Where the vehicle is hitched to a tow vehicle, it can significantly slow the tow vehicle and substantially increase the amount of fuel required. It should be appreciated that the term "vehicle" is used broadly to refer to towable and drivable vehicles (and towable and drivable vehicles), including towable trailers without an engine.

Some efforts have been made to make vehicles more aerodynamic, for example, by reducing the aerodynamic coefficient of the vehicle by modifying the physical shape of the vehicle (e.g., making it more teardrop shaped). Bowlus® (luxury travel trailer brand) trailers are curved with an elongated teardrop shape and a semi-spherical roof in an effort to create less drag than box-shaped trailers. However, they have awkward spaces that are curved (e.g., sides, tops, front and/or back of the vehicle) and/or relatively short in height. The side walls curve towards one another in the rear leaving no back wall (or no substantial back wall). Such spaces are less usable as most items placed in such vehicles are made to be placed in boxy spaces (e.g., beds, chairs, tables and other furniture items, appliances, boxes, containers), and sometimes stacked. Further, such spaces are typically less comfortable to be in.

Others have tried installing wedge like wind deflectors that stick out on top of vehicles (e.g., AeroShield wind deflectors), or adding roof vent covers that have a more aerodynamic shape than the roof vent itself.

Devices, systems and methods provided herein advantageously provide a more aerodynamic shape to an object using air flow, while maintaining a more people friendly or storage friendly shape of the underlying object (e.g., vehicle).

Other advantages and benefits of the disclosed compositions and methods will be apparent to one of ordinary skill with a review of the following drawings and detailed description.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description.

In some aspects, a system comprises at least one venturi generator. Some known venturi generators include the Dyson bladeless fan, and those described in U.S. Pat. No. 8,308,445 to Dyson Technology Ltd, which is incorporated herein in its entirety. By using, for example, a fan and/or a NACA duct (or other mechanism or device to create airflow), the venturi generator is able to use entrainment and the Coanda effect to increase and shape the airflow around or beyond a shape in order to improve aerodynamics.

Figure 1:
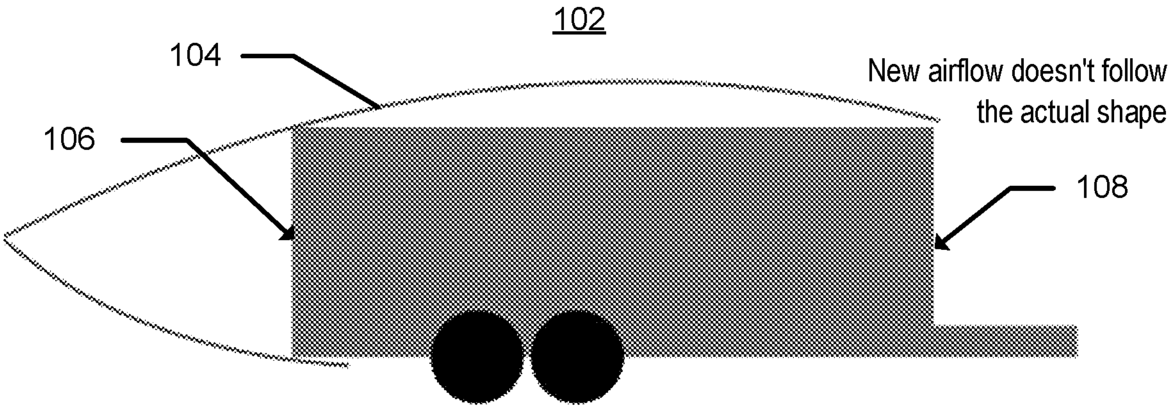
FIG. 1 illustrates new airflow (virtual shape) generated by a venturi generator installed on a vehicle, according to an embodiment.

The at least one venturi generator can be configured for installation on a vehicle 102, such as a land vehicle (e.g., car, truck, RV, camper, trailer) a water vehicle, an aircraft, or a vehicle for a combination of land, water, and air. The at least one venturi generator can be a passive or active powered venturi generator, or a combination thereof. Passive venturi generators use some of the surrounding air from the vehicle (e.g., trailer) to increase the airflow using the venturi generator. Active venturi generators use a fan to provide airflow to increase airflow using the venturi generator. As shown in FIG. 1, in some embodiments, the airflow 104 from one or more venturi generators (not shown) installed on a vehicle 102 does not follow the actual shape of the underlying vehicle 102. Instead, the airflow provides an aerodynamic shape 104 (shown in curved lines, referred to herein as a "virtual shape") to a people-friendly package. Thus, it should be appreciated that the systems described herein can advantageously improve the aerodynamic efficiency of a vehicle 102 (reducing the amount of energy used to travel at any given speed, reducing drag and wind noise, minimizing noise emission, preventing instability, and/or improving car handling) while maintaining the benefits of a more people-friendly design of the vehicle 102 the one or more venturi generators is coupled to (e.g., by maintaining a loaf design).

It is contemplated that one, two, three, four, five, or any other suitable number of venturi generators can be installed on a vehicle, such as vehicle 102. The venturi generators can have any suitable shape and be of any suitable size. In some aspects, the mouth of the generator (where a primary air flow exits) can be positioned around an entire rear end and/or front end of a vehicle, or anywhere along a shape or structure. In some aspects, one or more venturi generators can be placed at or adjacent the rear end 106 of the vehicle 102. In some aspects, one or more venturi generators can be placed at or adjacent the front end 108 of the vehicle 102. In some aspects, one or more venturi generators can be placed on the sides of the vehicle 102 (e.g., one or more on each side of the vehicle 102). In some contemplated systems, the venturi generator or portion thereof can be movable and/or adjustable, for example, along a length of the the vehicle 102 and/or to modify a virtual shape 104

Figure 2:
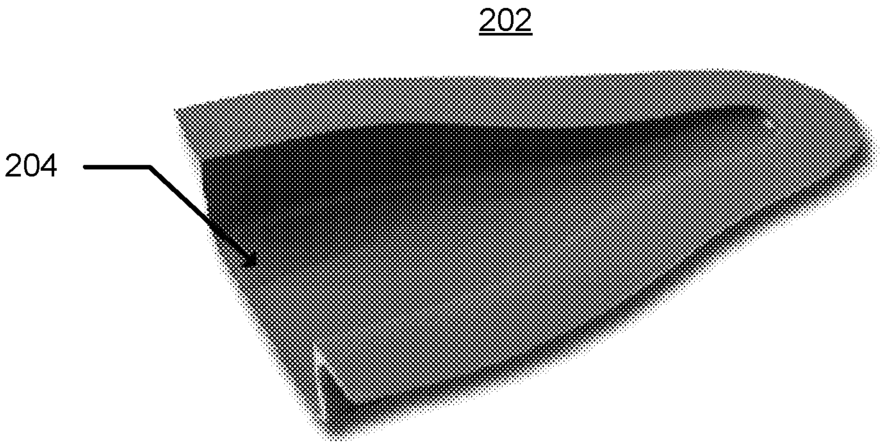
FIG. 2 illustrates a NACA duct.

In some aspects, a system comprises one or more ducts or inlets, for example, NACA ducts (also known as a NACA scoop or NACA inlet). In some embodiments, a vehicle 102 can comprise one or more flying buttresses comprising an inlet or opening. In some embodiments, a vehicle 102 can comprise one or more flying buttresses that direct air towards one or more inlets. FIG. 2 is an image of a contemplated NACA duct 202. Contemplated NACA ducts can have a shape that widens and insets into the bodywork of the vehicle 102, with a duct opening 204 at the widened end. Without wishing to be bound by any particular theory, it is contemplated that NACA duct(s) create counter-rotating vortices that deflect the boundary layer away from the intake, but draw in the faster-moving air above or around it. The NACA duct(s) can allow for air to get into the vehicle 102 without creating a lot of drag. The NACA duct(s) can have an intake shape that drops in towards the inside of the bodywork of the vehicle 102. Without wishing to be bound by any particular theory, it is contemplated that the shape of the intake allows the duct to scavenge and draw the slower moving air of the boundary layer that clings to the bodywork of the vehicle 102 into the opening at an end of the NACA duct. Vortices generated by the walls of the duct shape can aid in the scavenging. In some aspects, the airflow from the NACA duct is directed to the venturi generator.

Figure 3:
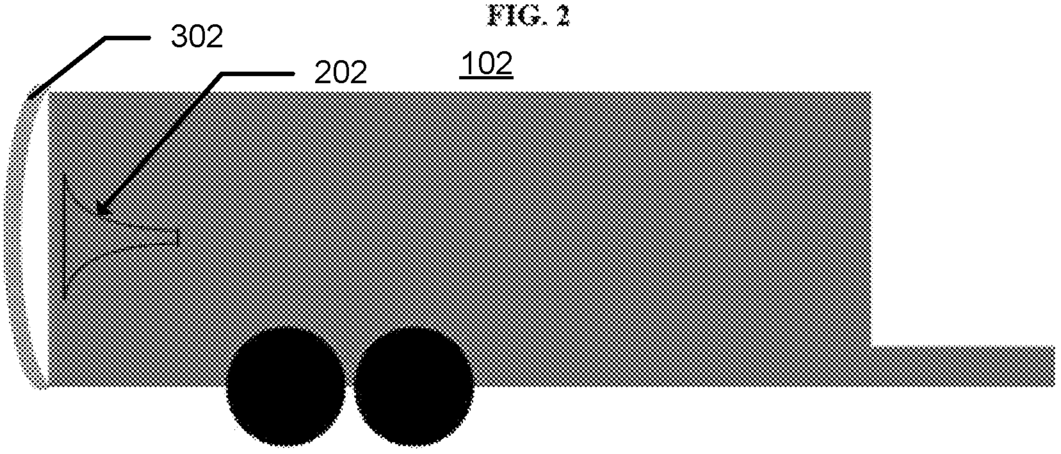
FIG. 3 illustrates a NACA duct on a towable trailer.

NACA ducts of any suitable size and shape are contemplated. It is contemplated that any suitable number of NACA ducts can be provided on any suitable parts(s) of a vehicle 102. FIG. 3 illustrates a NACA duct 202 on a rear right side portion of a vehicle 102. A goal is laminar flow. A NACA duct 202 can also be provided on the rear left side portion of the vehicle 102. The curved line 302 shown behind the vehicle of FIG. 3 represents a wing like shape of a mouth of a venturi generator 202, according to an embodiment.

In some aspects, contemplated systems can comprise at least one venturi generator and at least one NACA duct 202 to form a virtual shape 104.

Figure 4:
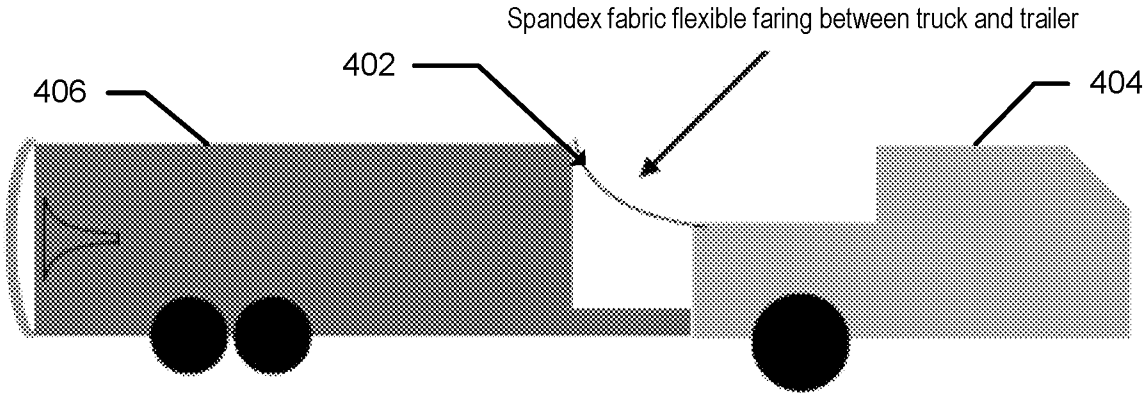
FIG. 4 illustrates a flexible faring between a tow vehicle and a trailer, according to an embodiment.

In some aspects, a flexible fairing 402 is contemplated, which can be configured to couple to and/or extend between a tow vehicle 404 and a vehicle 406 being towed to smooth the airflow between the tow vehicle 404 and the vehicle being towed 406. An example is illustrated in FIG. 4. In some aspects, the flexible fairing 402 can extend out from at least one of the vehicles and change shapes as necessary, for example, for turns. In some contemplated aspects, the flexible fairing 402 can be a flexible tube or sheet made of any suitable material (e.g., spandex, an elastic material, an inelastic material), In some contemplated aspects, the flexible fairing 402 connects the tow vehicle 404 and the vehicle 406 being towed. The flexible fairing 402 can be coupled to the tow vehicle 404 and/or the vehicle 406 being towed in any suitable manner using any suitable coupling mechanisms.

Thus, specific examples of devices, systems and methods for modifying aerodynamics have been disclosed. The above description of the disclosed embodiments is provided to enable any person skilled in the art to make or use the invention. The preceding detailed description is merely exemplary in nature and is not intended to limit the invention or the application and uses of the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The illustrations may include exaggerated dimensions and graphical representation to better illustrate the referenced items shown, and are not considered limiting unless expressly stated as such.

Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

As used herein and in the appended claims, the singular forms "a," "an," and "the" include plural referents unless the context clearly dictates otherwise. It is further noted that the claims can be drafted to exclude any optional element. As such, this statement is intended to serve as antecedent basis for use of such exclusive terminology as "solely," "only" and the like in connection with the recitation of claim elements, or use of a "negative" limitation.

Also, as used herein, and unless the context dictates otherwise, the term "coupled to" is intended to include both direct coupling (in which two elements that are coupled to each other contact each other) and indirect coupling (in which at least one additional element is located between the two elements).

Reference throughout this specification to "an embodiment" or "an implementation" means that a particular feature, structure, or characteristic described in connection with the embodiment is included in at least one embodiment or implementation. Thus, appearances of the phrases "in an embodiment" in various places throughout this specification are not necessarily all referring to the same embodiment or a single exclusive embodiment. Furthermore, the particular features, structures, or characteristics described herein may be combined in any suitable manner in one or more embodiments or one or more implementations.

The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Certain numerical values and ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating un-recited number may be a number which, in the context in which it is presented, provides the substantial equivalent of the specifically recited number.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

All structural and functional equivalents to the components of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A system, comprising:

at least one NACA duct, the NACA duct included in the body of a vehicle and comprising an intake shape that drops in towards the inside of the bodywork of the vehicle and wherein the NACA duct is oriented such that the intake is parallel with the front to back axis of the vehicle;

at least one venturi generator, coupled with the at least one NACA duct; and wherein the at least one venturi generator and at least one NACA duct are positioned at rear of the vehicle and outputs a laminar airflow from front to back of the vehicle.

2. The system of claim 1, wherein the at least one venturi generator comprises a passive venturi generator.

3. The system of claim 1, wherein the at least one venturi generator comprises an active venturi generator.

4. The system of claim 1, wherein the airflow provides an aerodynamic virtual shape to the vehicle.

5. The system of claim 1, wherein the airflow from the at least one venturi generator improves the aerodynamic properties of the vehicle.

6. The system of claim 1, wherein the airflow from the at least one venturi generator reduces wind resistance (drag) of the vehicle.

7. The system of claim 1, wherein the at least one venturi generator improves a fuel efficiency of the vehicle when coupled to the vehicle.

8. The system of claim 1, further comprising a flexible fairing configured to extend between a tow vehicle and a vehicle being towed.

* * * * *